US008043644B2

(12) United States Patent  (10) Patent No.: US 8,043,644 B2
Roth  (45) Date of Patent: Oct. 25, 2011

(54) METHOD FOR EXPOSING COMMINUTED FOODSTUFFS TO A PROCESSING FLUID

(75) Inventor: Eldon Roth, Dakota Dunes, SD (US)

(73) Assignee: Freezing Machines, Inc., Dakota Dunes, SD (US)

( * ) Notice: Subject to any disclaimer, the term of this patent is extended or adjusted under 35 U.S.C. 154(b) by 1500 days.

(21) Appl. No.: 11/074,033

(22) Filed: Mar. 7, 2005

(65) Prior Publication Data

US 2005/0153029 A1 Jul. 14, 2005

Related U.S. Application Data

(60) Division of application No. 10/173,955, filed on Jun. 18, 2002, now Pat. No. 7,322,284, which is a continuation-in-part of application No. 09/579,783, filed on May 26, 2000, now Pat. No. 6,406,728, which is a division of application No. 09/286,699, filed on Apr. 6, 1999, now Pat. No. 6,142,067.

(51) Int. Cl.
*A23B 4/16* (2006.01)
(52) U.S. Cl. ........ 426/320; 426/332; 426/335; 426/646; 426/506; 426/513; 426/519
(58) Field of Classification Search ............. 426/641, 426/646, 506, 513, 519, 312, 315, 320, 322, 426/335; 99/516, 534–536
See application file for complete search history.

(56) References Cited

U.S. PATENT DOCUMENTS

| 2,085,108 | A | * | 6/1937 | Louisot et al. | 426/601 |
| 2,539,232 | A | * | 1/1951 | Dempster | 83/646 |
| 2,595,210 | A | | 4/1952 | Clinefelter | |
| 2,797,904 | A | | 7/1957 | Voorheis | |

(Continued)

FOREIGN PATENT DOCUMENTS

GB 1223159 2/1971

(Continued)

OTHER PUBLICATIONS

Roth, "Apparatus for Treating Ammoniated Meat" Non-Provisional Patent Application filed Sep. 15, 2003, U.S. Appl. No. 10/662,616.

(Continued)

*Primary Examiner* — Drew E Becker
(74) *Attorney, Agent, or Firm* — Russell D. Culbertson; The Culbertson Group, P.C.

(57) ABSTRACT

A method includes producing a flowing sheet of comminuted foodstuff and then exposing the flowing sheet of material to a processing fluid in at least one of the major surfaces of the sheet. The transverse dimension of the flowing sheet of material may be generally equal to a dimension of the foodstuff pieces making up the comminuted foodstuff. The processing fluid may enter the sheet of material through one or both of the opposing surfaces used to form the sheet. Discrete openings may be formed through a wall of material used to form one of the major surfaces of the flowing sheet of material, and the processing fluid may be applied through such discrete openings. The processing fluid may also be applied through a porous and permeable material included in, or making up, a wall used to form one of the major surfaces of the flowing sheet of material.

11 Claims, 6 Drawing Sheets

U.S. PATENT DOCUMENTS

| | | | |
|---|---|---|---|
| 2,815,532 A | | 12/1957 | Braunlich |
| 2,858,219 A | | 10/1958 | Benson |
| 3,023,109 A | | 2/1962 | Hines |
| 3,064,680 A | | 11/1962 | Winslow, Jr. |
| 3,119,696 A | | 1/1964 | Williams |
| 3,232,590 A | | 2/1966 | Eckert |
| 3,413,387 A | | 11/1968 | Ohsol |
| 3,429,710 A | * | 2/1969 | Gnaedinger ............ 426/506 |
| 3,663,719 A | * | 5/1972 | Gnaedinger ............ 426/510 |
| 3,681,851 A | | 8/1972 | Fleming |
| 3,711,392 A | | 1/1973 | Metzger |
| 3,792,839 A | | 2/1974 | Gidge |
| 3,875,310 A | | 4/1975 | Rawlings et al. |
| 3,934,050 A | * | 1/1976 | Hawkins ............ 426/645 |
| 3,936,382 A | | 2/1976 | White |
| 4,068,008 A | * | 1/1978 | Orchard ............ 426/272 |
| 4,107,262 A | | 8/1978 | Leunders et al. |
| 4,125,635 A | * | 11/1978 | de Ruyter ............ 426/506 |
| 4,212,544 A | | 7/1980 | Crosby |
| 4,230,410 A | | 10/1980 | Kastl et al. |
| 4,404,229 A | * | 9/1983 | Treharne ............ 426/513 |
| 4,419,414 A | | 12/1983 | Fischer |
| 4,567,050 A | | 1/1986 | Roth |
| 4,626,187 A | | 12/1986 | Kamada |
| 4,758,097 A | | 7/1988 | Iles, Sr. |
| 4,910,040 A | * | 3/1990 | Sagarino et al. ............ 426/656 |
| 4,919,955 A | | 4/1990 | Mitchell |
| 4,995,803 A | * | 2/1991 | Champalaune et al. ...... 425/190 |
| 5,082,679 A | | 1/1992 | Chapman |
| 5,106,240 A | | 4/1992 | Dirkse et al. |
| 5,338,113 A | | 8/1994 | Fissenko |
| 5,374,405 A | | 12/1994 | Firnberg et al. |
| 5,393,547 A | | 2/1995 | Balaban et al. |
| 5,405,630 A | | 4/1995 | Ludwig |
| 5,433,142 A | | 7/1995 | Roth |
| 5,492,404 A | | 2/1996 | Smith |
| 5,556,200 A | | 9/1996 | Ekholm et al. |
| 5,558,774 A | | 9/1996 | Tonelli et al. |
| 5,564,332 A | | 10/1996 | Ludwig |
| 5,639,485 A | | 6/1997 | Weinstein et al. |
| 5,660,039 A | | 8/1997 | Sion et al. |
| 5,762,993 A | | 6/1998 | Gundlach et al. |
| 5,772,721 A | | 6/1998 | Kazemzadeh |
| 5,853,576 A | | 12/1998 | Kapulnik et al. |
| 5,858,283 A | | 1/1999 | Burris |
| 5,863,587 A | | 1/1999 | Badertscher et al. |
| 5,871,795 A | | 2/1999 | Roth |
| 5,919,509 A | | 7/1999 | Cremers et al. |
| 6,132,079 A | | 10/2000 | King |
| 6,142,067 A | | 11/2000 | Roth |
| 6,170,979 B1 | | 1/2001 | Smeaton |
| 6,238,080 B1 | | 5/2001 | Jarchau |
| 6,389,838 B1 | | 5/2002 | Roth |
| 6,406,728 B1 | | 6/2002 | Roth |
| 6,564,700 B2 | | 5/2003 | Roth |
| 6,767,007 B2 | | 7/2004 | Luman |
| 7,093,973 B2 | | 8/2006 | Roth |
| 2003/0017252 A1 | | 1/2003 | Roth |

FOREIGN PATENT DOCUMENTS

| | | |
|---|---|---|
| JP | 62-196082 | 2/1989 |
| SU | 2081186/13 | 12/1976 |
| WO | WO 93/17562 | 9/1993 |
| WO | WO 03/015598 A1 | 12/2003 |

OTHER PUBLICATIONS

Author Unknown, "Mott Spager Application; pH Control—Neutralizing Alkaline Solutions," Mott Industrial, Division of Mott Corporation, Feb. 1996.

Author Unknown, "A Guide to Advanced Steam Sparging," Mott Industrial, Division of Mott Corporation, Feb. 1996.

Author Unknown, "Sparging/Gas-Liquid Contacting Design Guide & Part Selection," Mott Industrial, Division of Mott Corporation, Feb. 1996.

* cited by examiner

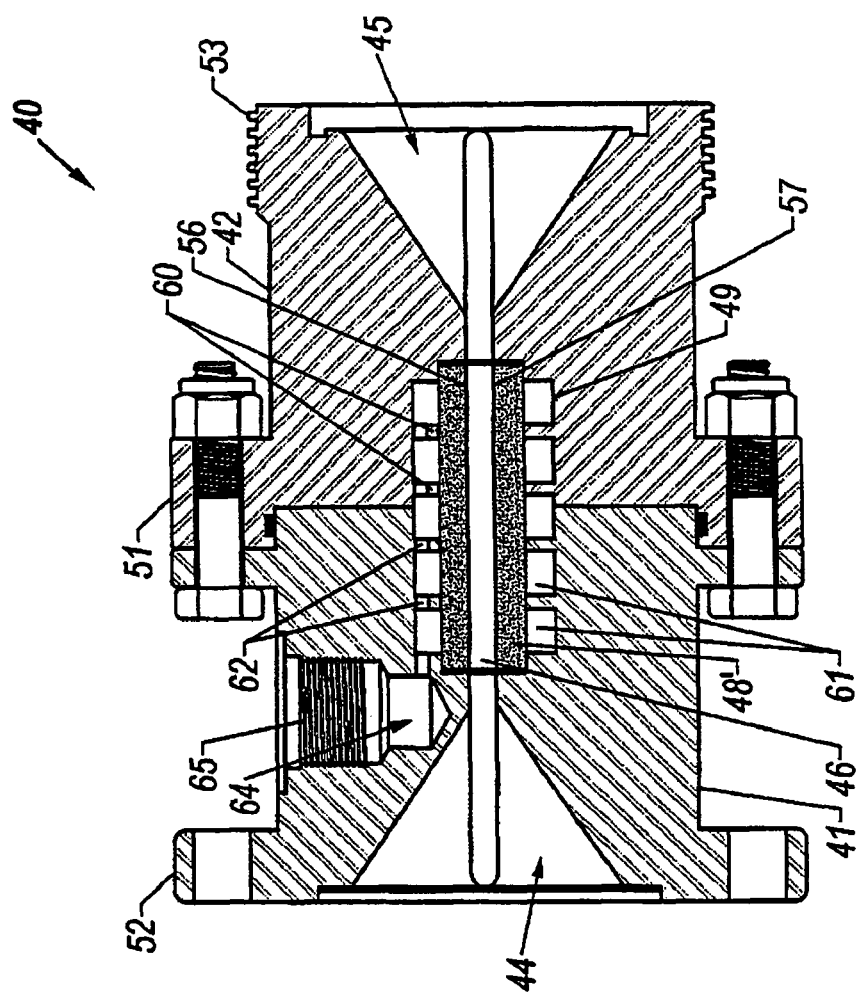
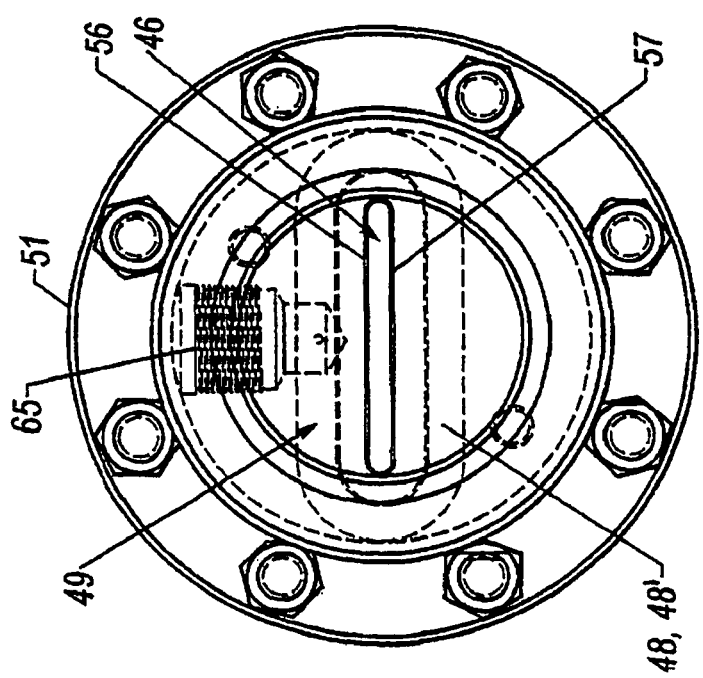
FIG. 8
FIG. 7

US 8,043,644 B2

METHOD FOR EXPOSING COMMINUTED FOODSTUFFS TO A PROCESSING FLUID

CROSS-REFERENCE TO RELATED APPLICATIONS

This application is a divisional application of U.S. patent application Ser. No. 10/173,955, filed Jun. 18, 2002, and entitled "Method and Apparatus for Exposing Comminuted Foodstuff to a Processing Fluid," now U.S. Pat. No. 7,322,284 which is a continuation-in-part of U.S. patent application Ser. No. 09/579,783, filed May 26, 2000, entitled "Method for Treating Ammoniated Meats," now U.S. Pat. No. 6,406,728, which was a divisional application of U.S. patent application Ser. No. 09/286,699, filed Apr. 6, 1999, entitled "Apparatus for Treating Ammoniated Meats," now U.S. Pat. No. 6,142,067. The Applicant claims the benefit of each of these prior U.S. patent applications pursuant to 35 U.S.C. §120. The entire content of each of these patents is hereby incorporated herein by this reference.

TECHNICAL FIELD OF THE INVENTION

The invention relates to foodstuff processing and, more particularly, to a method for exposing comminuted foodstuffs to a processing fluid such as ammonia gas or aqueous ammonia.

BACKGROUND OF THE INVENTION

Certain food processing operations require adding processing fluids to a foodstuff. U.S. Pat. No. 5,871,795, for example, discloses a method using ammonia and/or carbon dioxide to modify the pH of a meat product. The treatment disclosed in U.S. Pat. No. 5,871,795 has been shown to decrease pathogenic microbe content in meat products. U.S. Pat. No. 6,389,838 also discloses a process in which a pH modifying material such as gaseous or aqueous ammonia is applied to meat products as part of an overall process that includes freezing and physically manipulating the pH modified meat product.

Treatment processes that expose foodstuffs to a processing fluid may require a controlled and consistent application of the processing fluid. Depending upon the treatment process, underexposure may not provide the desired results, while overexposure to the processing fluid may produce undesirable results. In the pH adjustment processes described in U.S. Pat. Nos. 5,871,795 and 6,389,838 for example, portions of the meat product being treated may be overexposed to the pH adjusting fluid while other portions of the meat product may be exposed to very little or none of the pH adjusting fluid. The overexposed portions may absorb sufficient adjusting fluid to affect the taste of the treated product and to produce a residual pH adjusting material odor. Underexposed portions of the meat product may not exhibit the desired pathogenic microbe inhibiting effect.

SUMMARY OF THE INVENTION

A method according to the present invention includes producing a flowing sheet of comminuted foodstuff and then exposing the flowing sheet of material to a processing fluid in at least one of the major surfaces of the sheet. The processing fluid may be any fluid to be added to the comminuted foodstuff such as ammonia gas, aqueous ammonia, carbon dioxide gas, or carbon dioxide in solution with water, for example. In one preferred form of the invention, the transverse dimension of the flowing sheet of material is generally equal to a dimension of the foodstuff pieces making up the comminuted foodstuff. The processing fluid may enter the sheet of material through one or both of the opposing surfaces that define the flow area of the sheet of material. Methods according to the invention facilitate an even and consistent exposure to the processing fluid throughout the flowing mass of comminuted foodstuff.

In one preferred method, the step of enabling the processing fluid to contact the flowing sheet of comminuted foodstuff includes directing the processing fluid through a number of discrete openings extending through one of two opposing surfaces that define a flow area for the sheet of comminuted foodstuff. Other forms of the invention may direct the processing fluid through a porous and permeable material included in one of two opposing surfaces that define the flow area for the sheet of comminuted foodstuff. The processing fluid may also be directed through openings or porous and permeable material in both of the opposing surfaces that define the flow area for the comminuted foodstuff. In any case, the processing fluid is preferably supplied from a processing fluid chamber having a portion adjacent to one of two opposing surfaces that define a flow area for the sheet of comminuted foodstuff, and having a portion adjacent to the other one of the two opposing surfaces that define the flow area for the sheet of comminuted foodstuff.

The flowing sheet of comminuted foodstuff is preferably a planar sheet of material or an annular sheet of material. In either case, producing the flowing sheet of comminuted foodstuff may include forcing the comminuted foodstuff through a reducing section of conduit having a minimum transverse dimension larger than the minimum transverse dimension of the flowing sheet of comminuted foodstuff. This reducing section of conduit reduces the transverse dimension of the flowing foodstuff down to the desired transverse dimension for making contact with the processing fluid.

The invention is particularly suited for comminuted foodstuffs such as meat or meat products, including beef, pork, lamb, and other red meats. The comminuted foodstuff may also include or be made up of poultry or sea foods. Comminuted foodstuffs that may be treated according to the present method may also include various additives or fillers. As used in this disclosure and the following claims, a "comminuted" material comprises generally a material which has been cut into relatively smaller pieces from one or more relatively larger pieces. The meat product being treated may be originally comminuted by any suitable device such as grinder or bowl chopper, or by manual trimming or cutting.

These and other advantages and features of the invention will be apparent from the following description of the preferred embodiments, considered along with the accompanying drawings.

BRIEF DESCRIPTION OF THE DRAWINGS

FIG. 7 is a right end view of the alternate contactor apparatus shown in FIG. 4.

FIG. 8 is a view in section similar to FIG. 5, but showing an alternate fluid communication arrangement.

DESCRIPTION OF PREFERRED EMBODIMENTS

Figure 1:
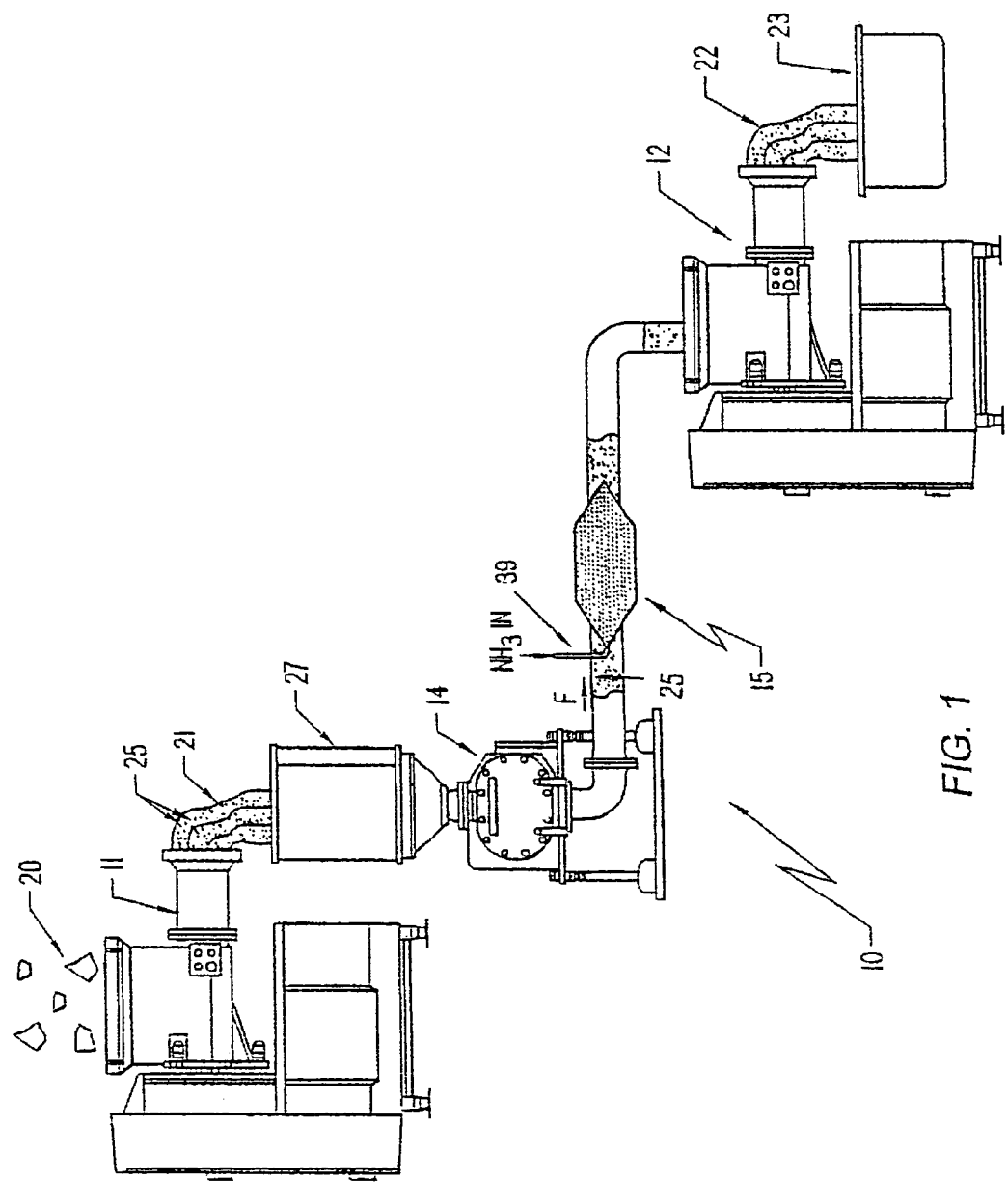
FIG. 1 is a somewhat diagrammatic side view of a treatment system incorporating a contactor apparatus that may be used to perform methods according to the invention, partially broken away to show the interior of the contactor apparatus.
Figure 2:
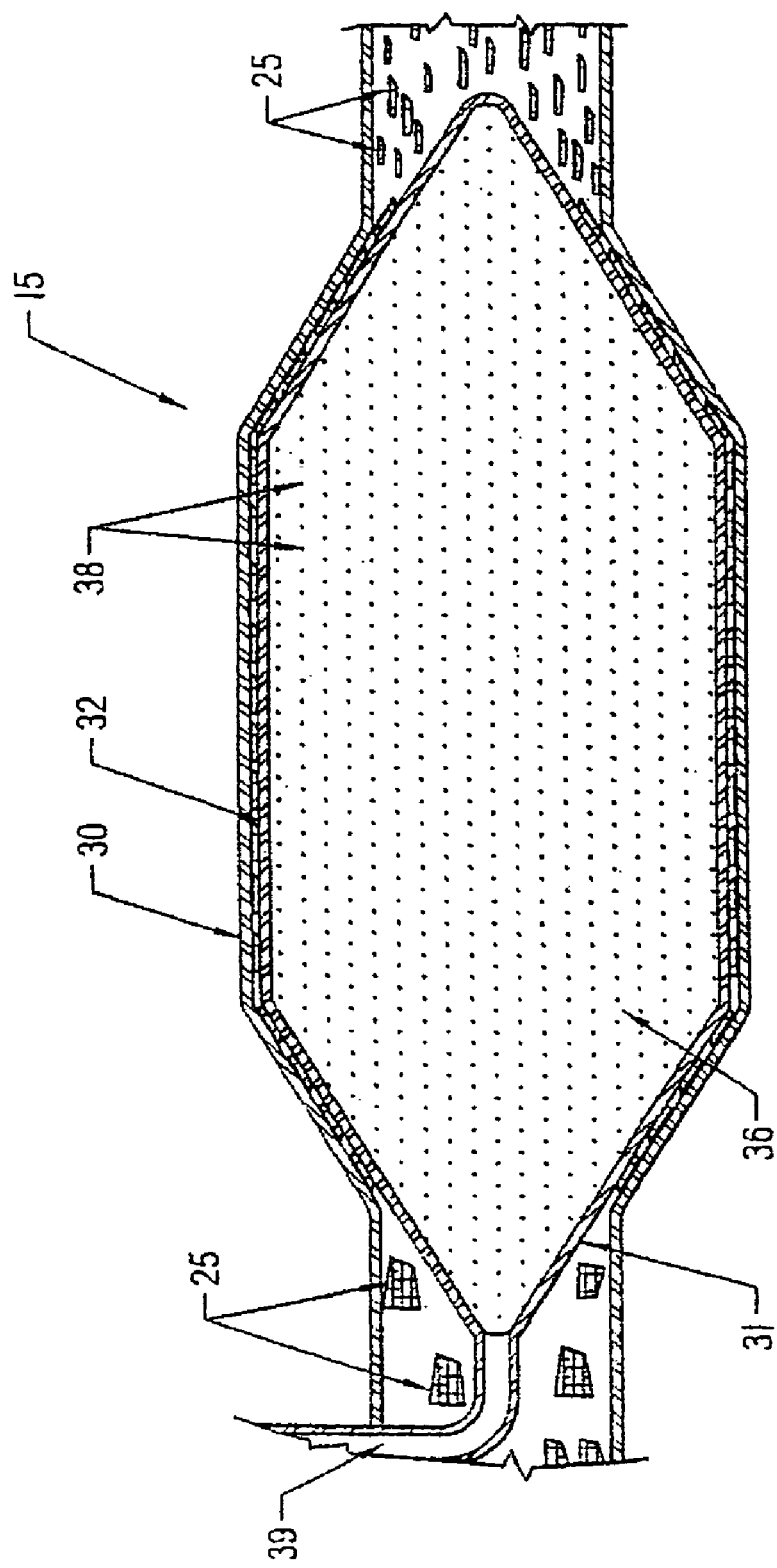
FIG. 2 is an enlarged longitudinal section view through the contactor apparatus shown in FIG. 1.
Figure 3:
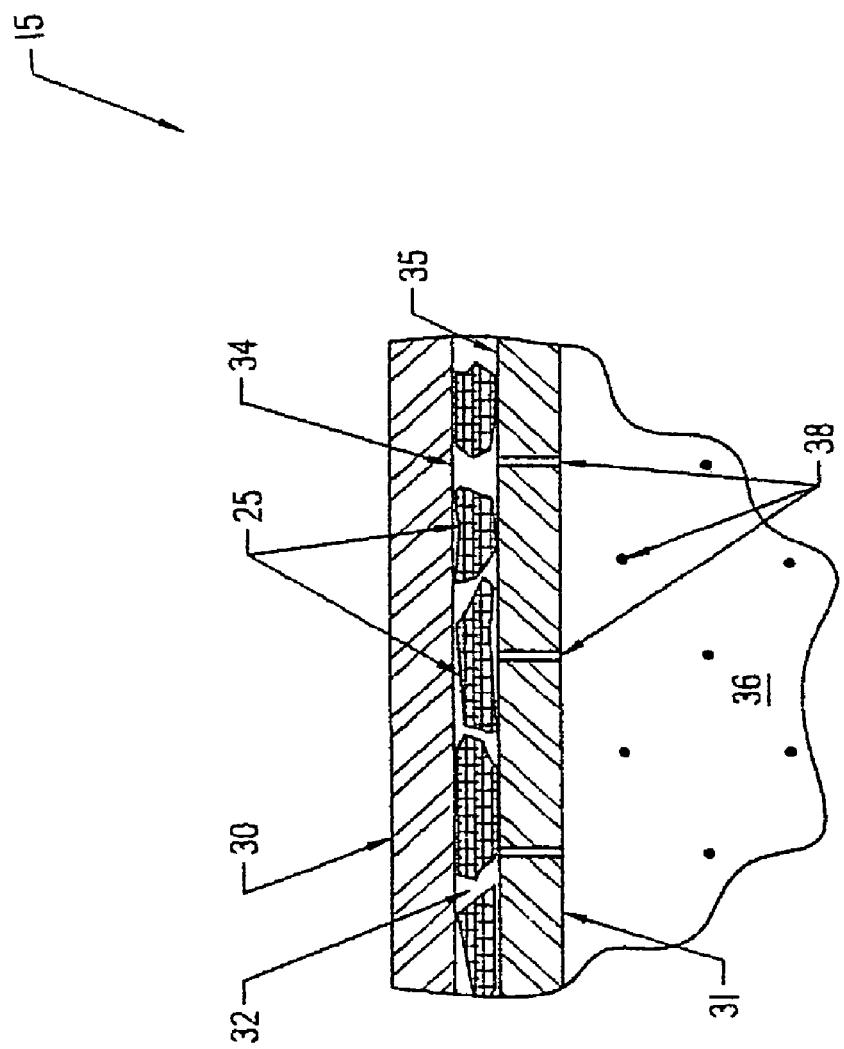
FIG. 3 is a further enlarged longitudinal section view through a portion of the contactor apparatus shown in FIG. 1.

FIGS. 1 through 3 illustrate one preferred form of treatment system 10 employing a contactor (sparger) apparatus 15 embodying the principles of the invention. Treatment system 10 includes an initial comminuting device 11 and a further comminuting device 12. Also, treatment system 10 includes a metering device 14 for directing the foodstuff through contactor apparatus 15.

Both of the comminuting devices 11 and 12 in this treatment system comprise grinders such as the Model No. 1109 grinder by Weiler & Company, Inc. Grinder 11 receives relatively large pieces of foodstuff such as meat product 20 and produces an initial comminuted meat product 21. The grinder plate associated with grinder 11 may include openings having a maximum dimension preferably between approximately two (2) inches and three-eighths (3/8) of an inch. In a more preferred form of the system, the grinder plate openings in grinder 11 have a maximum dimension of between one-half (1/2) of an inch to three-eighths (3/8) of an inch. The maximum dimension of the openings in the grinder plate generally determines the maximum dimension of the comminuted material exiting the grinder.

It will be appreciated that the original comminuted product 21 exiting grinder 11 is made up of a plurality of discrete pieces arranged together in a continuous mass. Individual pieces are represented in the drawings at reference numeral 25. Since these individual pieces are mixed together with other discrete pieces, they are not necessarily visible individually from the collective mass of material. However, the discrete pieces 25 are shown for purposes of explaining the operation of the invention.

In treatment system 10, grinder 12 receives the initial comminuted meat product after the material has been exposed to a processing fluid such as gaseous or aqueous ammonia in the contactor apparatus 15. Grinder 12 further comminutes the initial comminuted material and may include a grinder plate having openings smaller than the openings in the grinder plate associated with grinder 11. For example, grinder 12 may include a grinder plate having openings with a maximum dimension of no greater than three-sixteenths (3/16) of an inch and preferably about one-eighth (1/8) of an inch. Alternatively, the grinder plate associated with grinder 12 may have the same size openings as grinder 11 and still perform some comminuting. In any event, the further comminuted material 22 exits grinder 12 and is collected for packaging or for transport to further processing equipment. FIG. 1 shows the further comminuted material 22 being collected in a receiving tub 23.

In the treatment system 10 shown in FIG. 1, metering device 14 comprises a suitable positive displacement metering device. Metering device 14 receives the comminuted foodstuff 21 in collection chute 27 and then meters the comminuted foodstuff through processing fluid contactor 15 as indicated by the flow direction shown at arrow F. Other forms of the treatment system may use other means for forcing the comminuted foodstuff into and through contactor 15. The particular metering or pumping device will include a motor for driving the device with sufficient power to force the comminuted foodstuff through contactor 15 and the conduits leading to and from the contactor.

FIGS. 2 and 3 show further details of contactor apparatus 15 shown in FIG. 1. Contactor 15 includes a contactor conduit or body 30 having a processing fluid chamber 31 positioned therein. The illustrated form of the invention shows chamber 31 positioned coaxially within contactor conduit 30, although the chamber may be mounted eccentrically in the contactor conduit within the scope of the invention. As shown best in FIG. 3, the coaxial arrangement leaves a uniform annular contact passage 32 defined between the inner wall 34 of contactor conduit 30 and the outer surface 35 of chamber 31. Contact passage 32 forms a portion of a flow passage for the comminuted foodstuff through contactor 15. Chamber 31 also includes an interior area 36 and a communication arrangement comprising a plurality of openings 38 which extend from the chamber interior area to the annular contact passage 32. For comminuted meat products the openings may be one thousandth of an inch in diameter or greater, and preferably no larger than about six thousandths of an inch in diameter. Finally, contactor 15 includes a supply tube 39 which is connected to feed a processing fluid from a supply (not shown) to the chamber interior area 36.

The form of the chamber 31 illustrated in the figures includes openings 38 which have been drilled or otherwise formed through the chamber wall. Other forms of the invention may include a chamber having walls made of a sintered material or other material that is permeable to the processing fluid. In still other forms of the invention, the contactor conduit wall may include machined openings or sections of permeable material. An annular supply chamber may be located around the contactor conduit for containing a processing fluid. This additional fluid communication arrangement may be used instead of, or in addition to, the inner chamber form of the invention which uses chamber 31 shown in FIGS. 1 through 3.

In the form of contactor shown in FIG. 1 through 3, the distance between contactor conduit inner wall 34 and the chamber outer surface 35, that is, the minimum dimension of the contact passage 32, may be any distance that will allow the original comminuted foodstuff 21 to be metered through the contact passage without substantially damaging the foodstuff. For example, the width of the annulus (between wall 34 and surface 35) may be around two inches. A preferred width of the annulus is between one-half (1/2) to one-eighth (1/8) of an inch, or no greater than the approximate maximum dimension of the pieces of material making up the comminuted foodstuff being treated in the contactor.

The treatment process performed by system 10 and the operation of contactor 15 may now be described with reference to FIGS. 1 through 3. Referring to FIG. 1, meat 20 is ground or otherwise comminuted to form the original comminuted meat product 21. This comminuted meat product is collected in metering device chute 27 and forced by metering device 14 through processing fluid contactor 15. In processing fluid contactor 15, at least a portion of the comminuted meat product 21 is exposed to the processing fluid such as aqueous or gaseous ammonia. The meat product passes from contactor 15 to grinder 12 where the material is preferably further comminuted. The further comminuted meat product 22 is expelled from device 12 and collected for packaging or for further processing.

In contactor 15, a thin layer of comminuted meat pieces 25 passes through contact passage 32. Preferably the thin layer comprises a single layer of individual comminuted meat pieces 25. The pieces 25 are exposed to the processing fluid on at least one surface as that surface passes over an opening 38 in chamber 31. Also, some processing fluid may flow from chamber 31 into the comminuted material mass as the material passes openings 38. For gaseous or aqueous ammonia exposure, the pressure in chamber 31 is controlled so that the pH of the further comminuted meat product 22 is at least about 6.0, or in the range from 6.0 to 11.0.

The foodstuffs may be processed according to the invention in a wide temperature range. For example, meat may be maintained at a temperature above 32° F. for both the process fluid contacting step and the further comminuting step. In any event, the meat product temperature should be high enough that some liquid component remains in the meat product during the further comminuting step.

Figure 4:
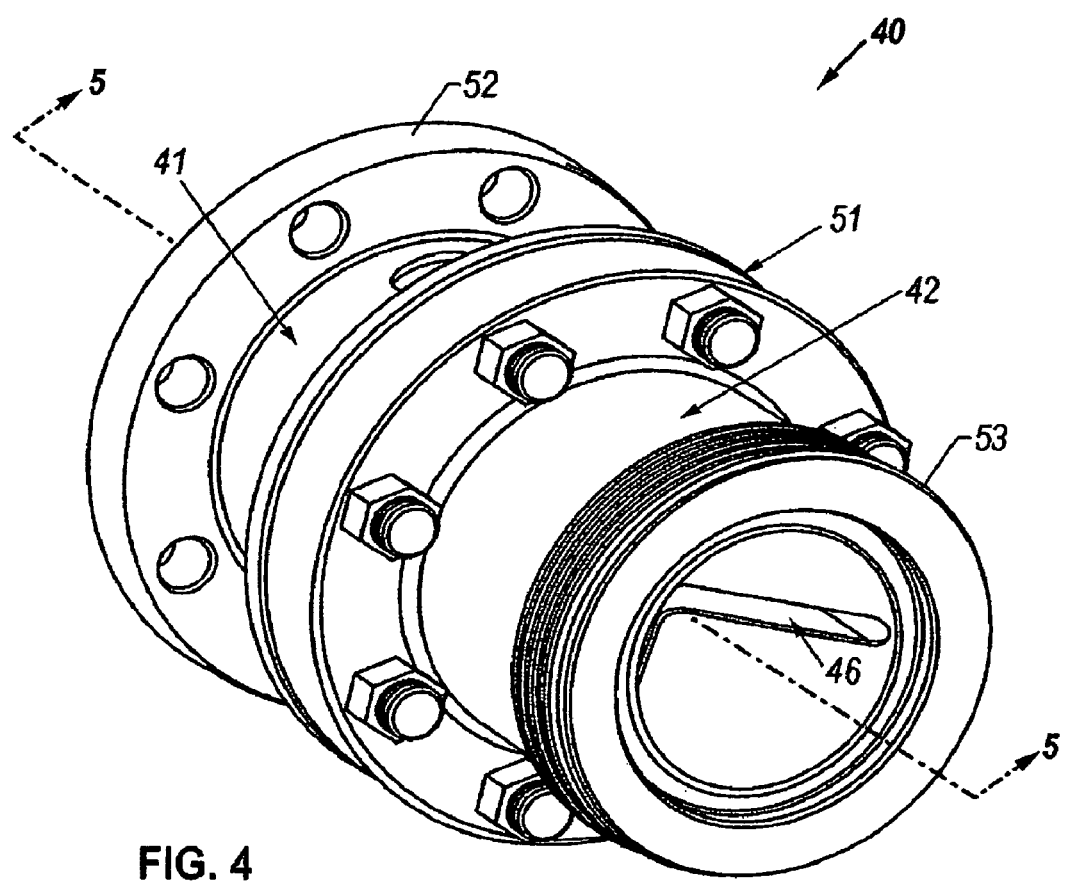
FIG. 4 is a view in perspective of an alternate contactor apparatus that may be used to perform methods according to the invention.
Figure 5:
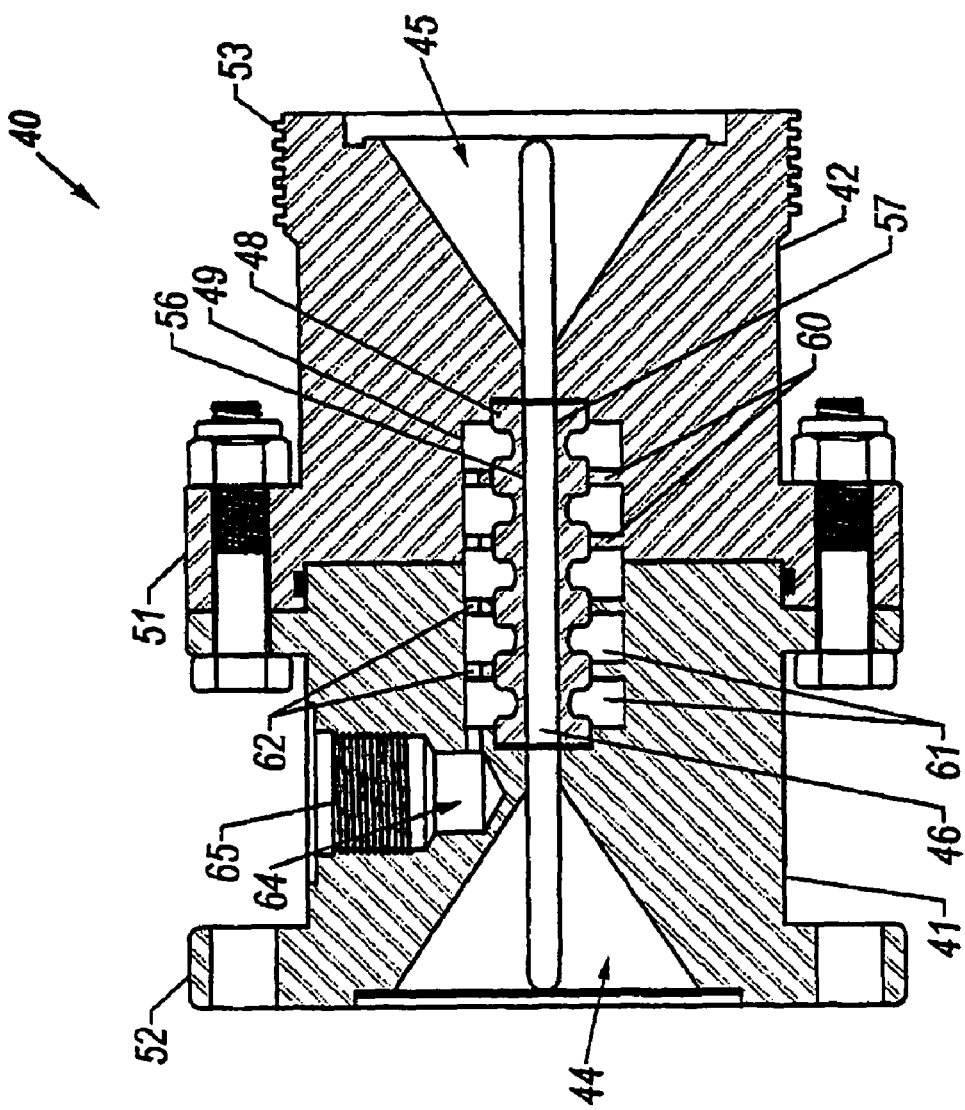
FIG. 5 is a view in section taken along line 5-5 in FIG. 4.

FIGS. 4 through 8 show alternate contactor (sparger) devices embodying the principles of the present invention. The perspective view of FIG. 4 shows the general structure of an alternate contactor device 40 while FIGS. 5 and 8 show two fluid communication variations within this general structure. The end view shown in FIG. 7 is substantially identical in both alternate forms of the invention shown in FIGS. 5 and 8.

Contactor 40 includes generally a contactor body formed by two components 41 and 42 and includes a foodstuff flow passage from a first end of the contactor body to a second end. The foodstuff flow passage in this form of the invention includes a first end or inlet end portion shown generally at reference numeral 44 and a second end or outlet end portion shown generally at reference numeral 45. These end portions 44 and 45 of the foodstuff flow passage are separated by a contact passage shown generally at reference numeral 46. As shown best in FIGS. 5 and 8, contact passage 46 is actually formed through a separate insert mounted within the contactor body. This insert is shown at reference numeral 48 in FIG. 5, and 48' in FIG. 8. The fluid communication arrangement in this form of the invention is associated with this insert as will be described further below. In both alternatives of the invention shown in FIGS. 5 and 8, a processing fluid chamber 49 is included in the contactor body. Processing fluid chamber 49 comprises an annular area encompassing the respective insert 48 or 48', and the insert separates fluid chamber 49 from contact passage 46.

The two end components 41 and 42 are flanged together with a flange connection shown generally at reference numeral 51. The illustrated form of contactor 40 also includes a flange 52 at one end for connecting the device to a suitable conduit, and a threaded connector 53 at the opposite end for connecting the opposite end to a suitable conduit. Although flange and threaded connectors are shown in the illustrated embodiment, it will be appreciated that the invention is by no means limited to these types of connectors. Also, although the two-piece arrangement (components 41 and 42) shown in the figures is preferred for its durability, ease of construction, and ease of assembly and disassembly, the invention is not limited to this two-piece contactor body.

It will be noted particularly from the section views of FIGS. 5 and 8 that the first and second end portions, 44 and 45 respectively, of the foodstuff flow passage generally define flow areas. The minimum transverse dimension of each end portion flow area reduces down from a relatively large transverse dimension at the outer ends of the flow passage to a relatively smaller minimum transverse dimension in a flow area defined by contact passage 46. As shown best in the end view of FIG. 7, the preferred contact passage 46 forms an elongated oval in transverse cross section. Contact passage 46 is thus defined between two narrowly spaced opposing surfaces or contact passage walls indicated by reference numerals 56 and 57. These two surfaces 56 and 57 are both generally planar and extend parallel to each other. When a comminuted foodstuff is forced to flow through the contactor 40, the foodstuff is forced into contact passage 46 where it forms a thin planar sheet of material. This relatively narrow sheet of the foodstuff is similar to the annular or cylindrical sheet of foodstuff described above in connection with the embodiment of the invention shown in FIGS. 1 through 3. Both sheets of material have a relatively small minimum transverse dimension, preferably on the order of a dimension of the pieces of material making up the comminuted foodstuff being treated.

Process fluid chamber 49 in the forms of the invention shown in FIGS. 4 through 8 comprises an annular area machined or otherwise formed in components 41 and 42 around the area that receives insert 48 or 48'. This annular area is shown divided by ribs 60 into separate longitudinally spaced apart chambers 61 in communication with each other through rib openings 62. Ribs 60 help support the respective insert 48 or 48' in the desired position. Processing fluid may enter chamber 61 through a processing fluid passage 64 formed in contactor body end component 41. Processing fluid passage 64 may also be associated with a suitable connection 65 for connecting to a processing fluid supply conduit (not shown) for supplying processing fluid to contactor 40.

Figure 6:
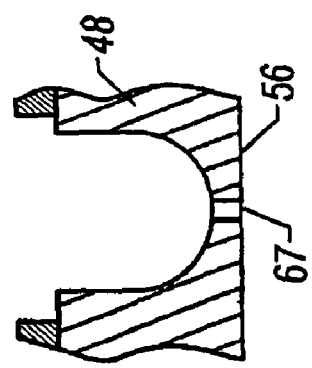
FIG. 6 is an enlarged view in section showing a portion of the insert in FIG. 5.

The fluid communication arrangement in the form of the invention shown in FIG. 6 includes a number of the small openings 67 drilled or otherwise formed through the material of insert 48 separating contact passage 46 and processing fluid chamber 49. These openings 67 preferably have a small transverse dimension no greater than about one-tenth of an inch for processing comminuted meats, and are illustrated in the enlarged section view of FIG. 6. Although openings 67 may be any size that allows the desired processing fluid contact with the foodstuff, the small openings are preferred because they allow processing fluid to flow from processing fluid chamber 49 into contact passage 46 to effect the desired contact with the foodstuff, but help prevent the foodstuff from flowing from the contact passage into the processing fluid chamber. It will also be appreciated that the processing fluid pressure maintained in chamber 49 also prevents foodstuffs from inadvertently flowing through openings 67 from contact passage 46 into processing fluid chamber 49. In the preferred form of the invention, a large number of the openings 67 are spaced apart across the entire width of each contact passage wall 56 and 57 in each chamber 61. Openings 67 are also preferably included in both lateral ends of contact passage 46.

An alternate form of the invention shown in FIG. 8 employs a porous and permeable material for the insert 48' in place of the solid and machined insert 48 shown in FIGS. 5 and 6. This material is permeable to the processing fluid and thus allows the processing fluid to flow from processing fluid chamber 49 into contact passage 46 under a suitable driving pressure differential between the processing fluid chamber and contact passage.

However, the openings that produce the desired permeability are preferably small enough to inhibit foodstuff from flowing from contact passage 46 into processing fluid chamber 49. Ceramics and sintered materials or any other suitable material having the desired permeability to the processing fluid may be used to form insert 48'. Composite inserts made up of solid material and permeable material sections may also be employed within the scope of the invention.

In both the discrete opening form of the fluid communication arrangement shown in FIGS. 5 and 6, and the permeable material fluid communication arrangement shown in FIG. 8, the openings provide fluid communication from chamber 49 to contact passage 46. That is, the openings at least allow processing fluid to pass from chamber 49 to contact passage 46 given the appropriate pressure in chamber 49. The openings that provide the fluid communication may be sized and shaped to inhibit flow of foodstuff from contact passage 46 to chamber 49, but it is not required. Rather, the pressure in chamber 49 may be controlled to prevent foodstuff from flowing into the openings making up the fluid communication arrangement.

Whether the sheet of material is planar as in contactor 40 or annular/cylindrical as in contactor 15, or some other shape, the thin sheet of foodstuff may be exposed to the processing fluid in an even and consistent manner. That is, the relatively thin sheet of foodstuff material may be exposed on both sides or major surfaces to the processing fluid. Where the spacing between the opposing surfaces of the contact passage is approximately equal to a dimension of foodstuff pieces making up the comminuted foodstuff, applying the processing fluid to the thin sheet generally ensures that each piece of the foodstuff is directly exposed to the processing fluid. This is to be contrasted with the situation in which a processing fluid is simply injected into a foodstuff flowing through a large conduit. In that case the processing fluid is inherently applied unevenly with some pieces directly exposed and other pieces exposed only indirectly.

The above described preferred embodiments are intended to illustrate the principles of the invention, but not to limit the scope of the invention. Various other embodiments and modifications to these preferred embodiments may be made by those skilled in the art without departing from the scope of the following claims. For example, the invention is not limited by specific materials for the various contactor components. Generally, the contactor body components may be formed from stainless steel, however, any material suitable for food handling may be used provided the material has suitable strength and other material characteristics. Porous and permeable material used in the fluid communication arrangement may comprise any suitable material. Also, the invention is not limited to a contact passage minimum transverse dimension equal to a dimension of the foodstuff pieces being treated. A single layer or line of foodstuff pieces passing through the contact passage is preferred for the reasons described above, but is not required.

The invention claimed is:

1. A method of exposing a comminuted foodstuff by forcing the comminuted foodstuff through a reducing section of conduit having a first internal surface portion and a second internal surface portion, the first internal surface portion tapering from an input dimension to the minimum transverse dimension of the flowing sheet of comminuted foodstuff to form a conical shape, the conical shape being symmetrical about the longitudinal center axis of the reducing section of conduit, and the second internal surface portion being defined by an elongated slot opening substantially maintaining the input dimension in a longitudinal plane of the reducing section so as to form a V-shape along the longitudinal plane at an intersection of the first internal surface portion and the second internal surface portion to a processing fluid, the method including:
   (a) producing a flowing sheet of the comminuted foodstuff, the flowing sheet having a minimum transverse dimension substantially equal to a dimension of the pieces of material making up the comminuted foodstuff; and
   (b) placing the processing fluid in contact with the flowing sheet of the comminuted foodstuff within one of the major surfaces of the flowing sheet of material by forcing the processing fluid through a porous and permeable material included in one of two opposing surfaces that define a flow area for the sheet of comminuted foodstuff.

2. The method of claim 1 further including placing the processing fluid in contact with the flowing sheet of the comminuted foodstuff within an opposite major surface of the flowing sheet of material by forcing the processing fluid through a porous and permeable material included in the second of the two opposing surfaces that define the flow area for the sheet of comminuted foodstuff 3. A method including:
   (a) producing a flowing mass of a comminuted foodstuff by forcing the comminuted foodstuff through a reducing section of conduit having a first internal surface portion and a second internal surface portion, the first internal surface portion tapering from a transverse dimension larger than the minimum transverse dimension of the flowing mass of comminuted foodstuff down to the minimum transverse dimension of the flowing mass of comminuted foodstuff to form a conical shape which is symmetrical about the longitudinal center axis of the reducing section of conduit, and the second internal surface portion being defined by an elongated slot opening maintaining the transverse dimension with respect to a longitudinal plane of the reducing section so as to form a V-shape along the longitudinal plane at an intersection of the first internal surface portion and second internal surface portion, the flowing mass of comminuted foodstuff having a minimum transverse dimension that is substantially equal to a dimension of pieces of material included in the comminuted foodstuff; and
   (b) placing a processing fluid in contact with the flowing mass of comminuted foodstuff along at least a portion of a boundary defining a flow area for the flowing mass of the comminuted foodstuff by directing the processing fluid through a porous and permeable material included in one of two opposing surfaces that define the flow area for the flowing mass of comminuted foodstuff 4. The method of claim 3 wherein the step of placing the processing fluid in contact with the flowing mass of comminuted foodstuff includes directing the processing fluid through a porous and permeable material in the other one of the two opposing surfaces that define the flow area for the flowing mass of comminuted foodstuff.

5. The method of claim 4 further including the step of supplying the processing fluid from a processing fluid chamber having a first portion adjacent to one of the two opposing surfaces that define the flow area for the flowing mass of comminuted foodstuff and a second portion adjacent to the other one of the two opposing surfaces that define the flow area for the flowing mass of comminuted foodstuff.

6. A method including:
   (a) forcing a mass of comminuted foodstuff through a reducing section of a conduit having a first internal surface portion and a second internal surface portion, the first internal surface portion tapering from a first transverse dimension to a relatively smaller second transverse dimension to form a conical shape between the first transverse dimension and the second transverse dimension, the conical shape being symmetrical about the longitudinal center axis of the reducing section conduit, and the second internal surface portion being defined by an elongated slot opening maintaining the first transverse dimension in a longitudinal plane of the reducing section so as to form a V-shape along the longitudinal plane at an intersection of the first internal surface portion and the second internal surface portion;

(b) forcing the mass of comminuted foodstuff from the reducing section of the conduit through a contacting section of the conduit having the second transverse dimension; and (c) placing a processing fluid in contact with the mass of comminuted foodstuff as the comminuted foodstuff passes through the contacting section of the conduit, the processing fluid being placed in contact with the mass of comminuted foodstuff along at least a portion of a boundary defining a flow area for the mass of the comminuted foodstuff in the contacting section of the conduit.

7. The method of claim 6 wherein the minimum transverse dimension of the flowing mass of comminuted foodstuff is substantially equal to a dimension of pieces of material included in the flowing mass of comminuted foodstuff.

8. The method of claim 6 wherein placing the processing fluid in contact with the flowing mass of comminuted foodstuff includes directing the processing fluid through a number of discrete openings extending through one of two opposing surfaces that define the flow area for the flowing mass of comminuted foodstuff.

9. The method of claim 6 wherein placing the processing fluid in contact with the flowing mass of comminuted foodstuff includes directing the processing fluid through a porous and permeable material included in one of two opposing surfaces that define the flow area for the flowing mass of comminuted foodstuff.

10. The method of claim 6 wherein placing the processing fluid in contact with the flowing mass of comminuted foodstuff includes directing the processing fluid through passages in both of two opposing surfaces that define the flow area for the flowing mass of comminuted foodstuff.

11. The method of claim 10 further including the step of supplying the processing fluid from a processing fluid chamber having a portion adjacent to one of the two opposing surfaces that define the flow area for the flowing mass of comminuted foodstuff and a portion adjacent to the other one of the two opposing surfaces that define the flow area for the flowing mass of comminuted foodstuff.

* * * * *